US012325333B2

(12) United States Patent
Dubocquet et al.

(10) Patent No.: US 12,325,333 B2
(45) Date of Patent: Jun. 10, 2025

(54) MULTI-PIVOT SEAT BASE ASSEMBLY

(71) Applicant: DEMERS, AMBULANCE MANUFACTURER INC./ DEMERS, MANUFACTURIER D'AMBULANCES INC., Beloeil (CA)

(72) Inventors: Gilbert Dubocquet, Saint-Jean-Sur-Richelieu (CA); Hélène Trahan, Beloeil (CA); Martin Laliberté, Beloeil (CA); Alain-Olivier Boudreau, St-Jean-sur-Richelieu (CA); Carl Grégoire, Ste-Julie (CA); Philippe Noël, Beloeil (CA); Stéphane Poulin, Ste-Julie (CA)

(73) Assignee: DEMERS, AMBULANCE MANUFACTURER INC./DEMERS, MANUFACTURIER D'AMBULANCES INC., Beloeil (CA)

( * ) Notice: Subject to any disclaimer, the term of this patent is extended or adjusted under 35 U.S.C. 154(b) by 320 days.

(21) Appl. No.: 17/997,378

(22) PCT Filed: May 3, 2021

(86) PCT No.: PCT/CA2021/000039
§ 371 (c)(1),
(2) Date: Oct. 28, 2022

(87) PCT Pub. No.: WO2021/223007
PCT Pub. Date: Nov. 11, 2021

(65) Prior Publication Data
US 2023/0166641 A1  Jun. 1, 2023

Related U.S. Application Data

(60) Provisional application No. 63/020,593, filed on May 6, 2020.

(51) Int. Cl.
*B60N 2/04* (2006.01)
*A61G 3/00* (2006.01)
(Continued)

(52) U.S. Cl.
CPC .............. *B60N 2/04* (2013.01); *A61G 3/003* (2013.01); *B60N 2/01* (2013.01); *B60N 2/0224* (2013.01);
(Continued)

(58) Field of Classification Search
CPC .......... B60N 2/04; B60N 2/01; B60N 2/0224; B60N 2/502; B60N 2/02253; B60N 2/24; A61G 3/003
See application file for complete search history.

(56) References Cited

U.S. PATENT DOCUMENTS 872,247 A     11/1907  Moss
3,608,855 A *  9/1971  Osenberg ............... B60N 2/505
                                                         248/419
(Continued)

FOREIGN PATENT DOCUMENTS

CN    210138251 U2   3/2020
EP      2716493 A2   4/2014
(Continued)

OTHER PUBLICATIONS

WO PCT/CA2021/000039—ISR.
WO PCT/CA2021/000039—WO.

*Primary Examiner* — Mark R Wendell
(74) *Attorney, Agent, or Firm* — Agence de Brevets Fournier

(57) ABSTRACT

Described herein are illustrative embodiments of a multi-pivot seat base assembly including a first pivot assembly having a fixed part mountable to a floor and a pivotable part, a proximate arm having a proximate end mounted to the
(Continued)

pivotable part of the first pivot assembly and a distal end including a fixed part of a second pivot assembly, a distal arm having a proximate end provided with a pivotable part of the second pivot assembly; the proximate end of the distal arm being pivotally mounted to the fixed part of the second pivot assembly; the distal arm including a distal end provided with a seat receiving post; and a controllable damping mechanism provided between the fixed part and the pivotable part of the first pivot assembly.

15 Claims, 19 Drawing Sheets

(51) Int. Cl.
    *B60N 2/01*     (2006.01)
    *B60N 2/02*     (2006.01)
    *B60N 2/50*     (2006.01)
    *B60N 2/24*     (2006.01)

(52) U.S. Cl.
    CPC .......... *B60N 2/502* (2013.01); *B60N 2/02253* (2023.08); *B60N 2/24* (2013.01)

(56) References Cited

U.S. PATENT DOCUMENTS

| | | | |
|---|---|---|---|
| 4,251,100 A | 2/1981 | Rolandelli | |
| 4,555,138 A | 11/1985 | Hughes | |
| 4,917,343 A * | 4/1990 | Wainscott | ......... F16M 11/2021 248/454 |
| 4,925,211 A | 5/1990 | Whittaker et al. | |
| 5,120,103 A | 6/1992 | Kave | |
| 5,178,432 A * | 1/1993 | Zeman | ................. A61G 3/0833 296/25 |
| 5,217,181 A | 6/1993 | Hammarskold et al. | |
| 5,364,151 A | 11/1994 | Yurasits | |
| 5,544,363 A | 8/1996 | McCue et al. | |
| 5,579,785 A | 12/1996 | Bell | |
| 5,632,521 A | 5/1997 | Archambault et al. | |
| 6,152,401 A | 11/2000 | Green | |
| 6,332,638 B1 * | 12/2001 | Menna | ..................... A61G 1/06 296/26.1 |
| 6,371,456 B1 * | 4/2002 | Ritchie | ................... F16F 15/02 248/550 |
| 6,460,922 B1 | 10/2002 | Demick | |
| 6,742,848 B2 | 6/2004 | Ruff | |
| 7,621,580 B2 | 11/2009 | Randjelovic et al. | |
| 8,104,727 B2 * | 1/2012 | Joanisse | ............... A47B 23/042 248/284.1 |
| 8,382,181 B2 | 2/2013 | Bourgraf et al. | |
| 9,027,978 B2 | 5/2015 | Bourgraf et al. | |
| 9,295,595 B2 | 3/2016 | Bourgraf et al. | |
| 9,493,093 B2 | 11/2016 | Stingle et al. | |
| 9,849,045 B2 | 12/2017 | Bourgraf et al. | |
| 2009/0015027 A1 * | 1/2009 | Lambarth | ............ A61G 3/0816 307/104 |
| 2017/0197532 A1 * | 7/2017 | Zwaan | ................... B60N 2/507 |
| 2020/0079262 A1 * | 3/2020 | Oleson | ................... B60N 2/829 |

FOREIGN PATENT DOCUMENTS

| | | |
|---|---|---|
| WO | WO 2007082040 A2 | 7/2007 |
| WO | WO 2019013726 A2 | 1/2019 |

* cited by examiner

MULTI-PIVOT SEAT BASE ASSEMBLY

FOREIGN PRIORITY CLAIM

This is a 35 U.S.C. § 371 application of, and claims priority to, International Application No. PCT/CA2021/000039, which was filed on May 3, 2021, and published as Publication No. WO 2021/223007A1, which claims priority to U.S. Provisional Patent Application No 63/020,593, which was filed on May 6, 2020, the entirety of all these applications are incorporated herein by reference.

FIELD

The present disclosure relates to seat bases. More specifically, the present disclosure is concerned with a multi-pivot seat base assembly.

BACKGROUND

Many vehicles, such as emergency vehicles and transport vehicles, are provided with seats that are fixedly mounted to the floor of the vehicle via seat bases for safety reasons.

In some cases, the seat bases are mounted into tracks, embedded in the floor of the vehicle, to allow some restricted movements of the seat occupants. These tracks have many drawbacks including the fact that foreign matter may be stuck therein and prevent desired movements.

DETAILED DESCRIPTION

Figure 1:
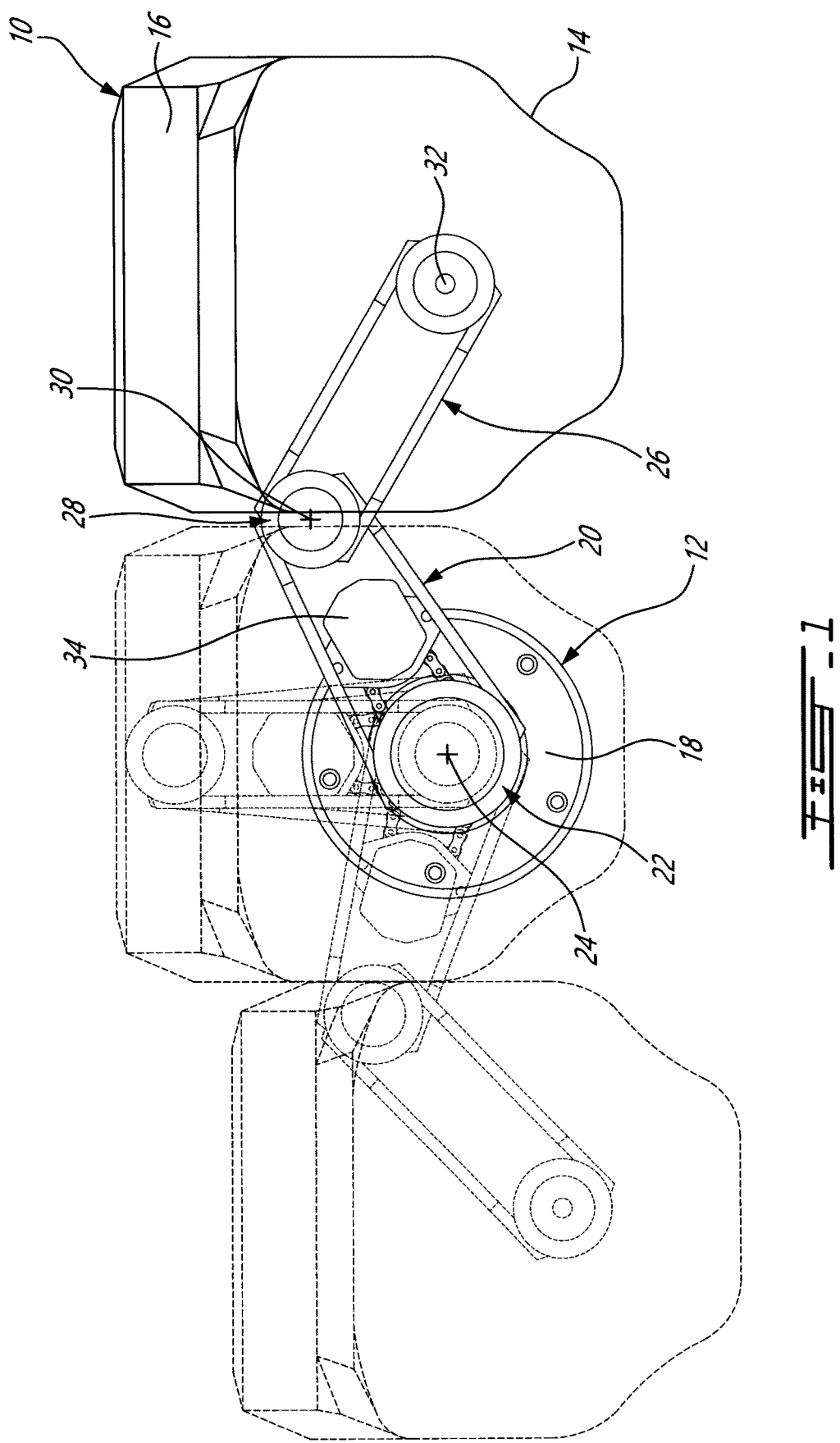
FIG. 1 is a top plan view of a seat provided with a multi-pivot base according to a first illustrative embodiment, shown in three different positions.
Figure 2:
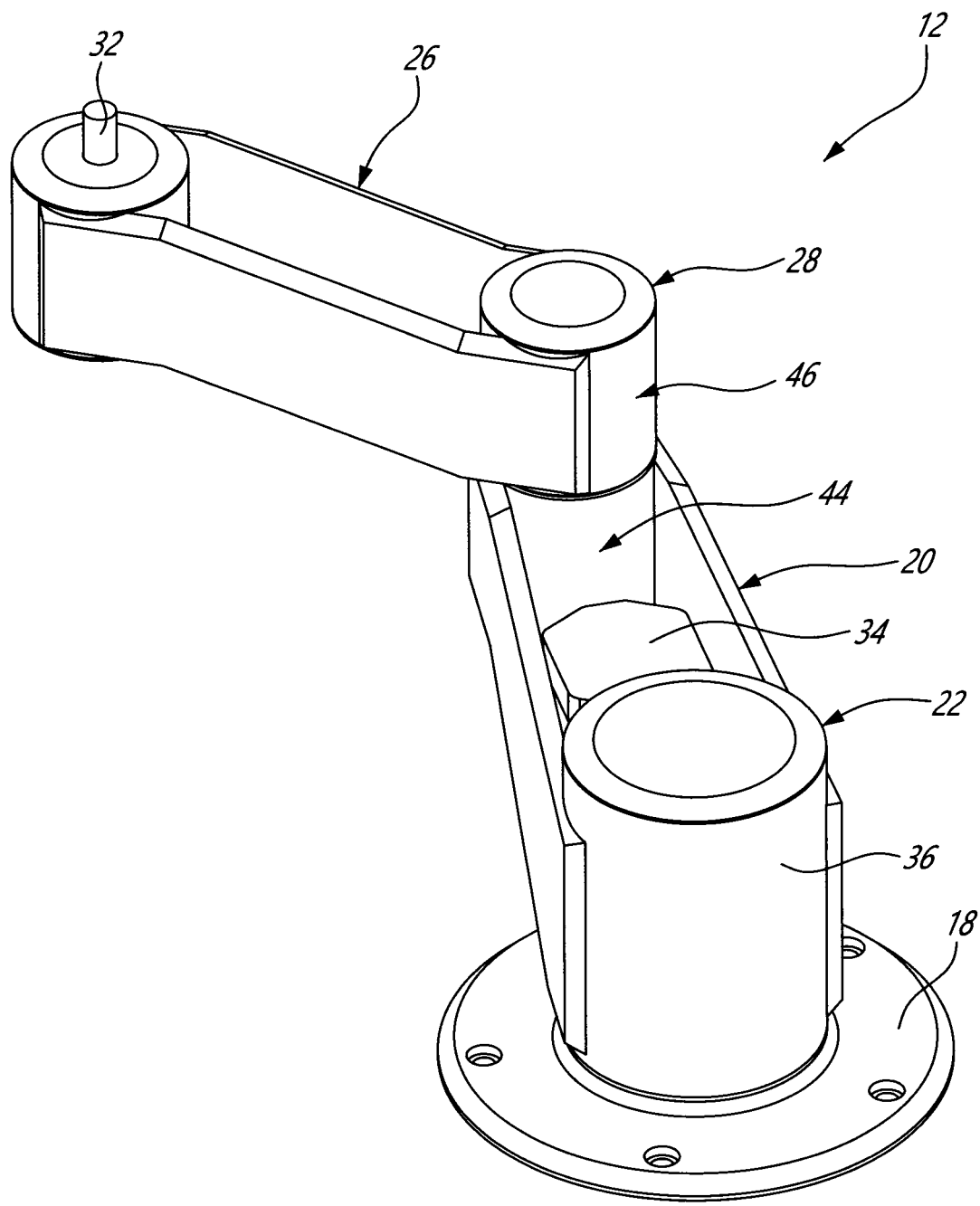
FIG. 2 is a perspective view of a multi-pivot base according to the first illustrative embodiment.

An object is to provide a multi-pivot seat base assembly.

More specifically, according to an illustrative embodiment, there is provided a multi-pivot seat base assembly including a first pivot assembly having a first shaft mountable to a floor, a proximate arm having a proximate end pivotally mounted to the first shaft of the first pivot assembly and a distal end, a distal arm having a proximate end and a distal end provided with a seat receiving element, a second pivot assembly pivotally interconnecting the distal end of the proximate arm and the proximate end of the distal arm, a pivot linking mechanism so configured that a pivotal movement of the distal arm about the second pivot assembly causes a pivotal movement of the proximate arm about the first pivot assembly, a damping mechanism associated with at least one of the first and second pivot assemblies, and a controllable locking mechanism associated with at least one of the first and second pivot assemblies to selectively prevent pivotal movement thereof.

According to another aspect, there is provided an ambulance compartment including a floor, wheel wells defining a generally square portion of the floor, an elongated floor mounted rail allowing a conventional stretcher mounted thereto to be positioned in a forward position in the ambulance compartment, and at least two seat bases mounted in the generally square portion of the floor.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

In the present specification and in the appended claims, various terminology which is directional, geometrical and/or spatial in nature such as "longitudinal", "horizontal", "front", rear", "upwardly", "downwardly", etc. is used. It is to be understood that such terminology is used for ease of description and in a relative sense only and is not to be taken in any way as a limitation upon the scope of the present disclosure.

The expression "connected" should be construed herein and in the appended claims broadly so as to include any cooperative or passive association between mechanical parts or components. For example, such parts may be assembled together by direct coupling, or indirectly coupled using further parts.

It is to be noted that while the present detailed description refers to an emergency vehicle such as an ambulance, other vehicles using seats that are fixedly mounted to a floor using a base can be provided with a multi-pivot base as described herein.

Other objects, advantages and features of the multi-pivot seat base assembly will become more apparent upon reading of the following non-restrictive description of illustrative embodiments thereof, given by way of example only with reference to the accompanying drawings.

Generally stated, an illustrative embodiment is concerned with a multi-pivot seat base assembly designed to be fixed to the floor of an emergency vehicle. The multi-pivot base includes proximate and distal arms so hinged together by a pivot and gearing that their movements are coordinated. Furthermore, a movement damping and locking mechanism is provided to provide a controllable level of damping and to allow an automatic lock of the multi-pivots in emergency situations.

FIG. 1 of the appended drawings illustrates a seat 10 mounted to a multi-pivot seat base assembly 12 according to a first illustrative embodiment. The seat assembly 10 conventionally includes a seat 14 and a back rest 16.

The multi-pivot seat base assembly 12 includes a generally circular anchoring plate 18, configured to be fixedly mounted to the floor, a proximate arm 20 so mounted to a first pivot assembly 22 as to be pivotable about a first pivot axis 24, a distal arm 26 so mounted to a second pivot assembly 28, provided between the proximate and distal arms, as to be pivotable about a second pivot axis 30. The free end of the distal arm 26 includes a seat receiving element in the form of a post 32, that may be viewed as a third pivot.

As will be clear from the following description, the second pivot assembly 28 includes elements that cause the proximate arm to pivot about the first pivot axis 24 when the distal arm 26 pivots about the second pivot axis 30.

In this first illustrative embodiment, the multi-pivot seat base assembly 12 also includes a controllable damping and locking mechanism 34 mounted to the proximate arm 20 and associated with the first pivot assembly 22 to control the force required to pivot the proximate arm 20 about the first pivot axis 24 as will be described herein.

FIG. 1 also illustrates, in dashed lines, two possible positions of the seat 10 with respect to the circular anchoring plate 18.

Turning now to FIGS. 2 to 5 of the appended drawings, the multi-pivot seat base assembly 12 will be described in greater details.

As can be seen from these figures, the first pivot assembly 22 has a generally cylindrical body 36 to which the proximate arm 20 is fixedly mounted, for example via welding. The controllable damping mechanism 34 is provided between the two plates that form the proximate arm 20.

Figure 3:
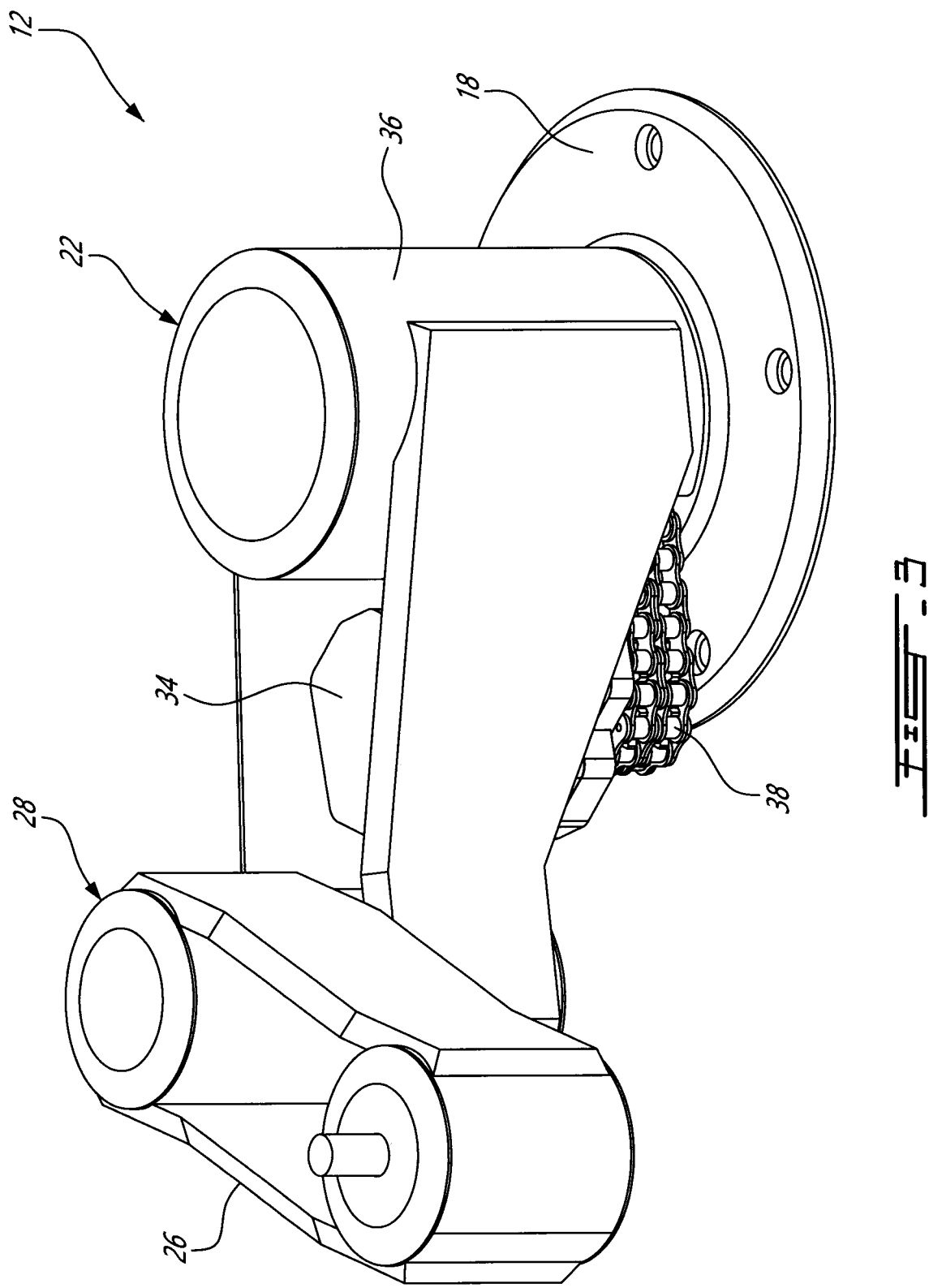
FIG. 3 is a perspective view of the multi-pivot base of FIG. 2 showing a portion of the movement damping and locking mechanism.
Figure 5:
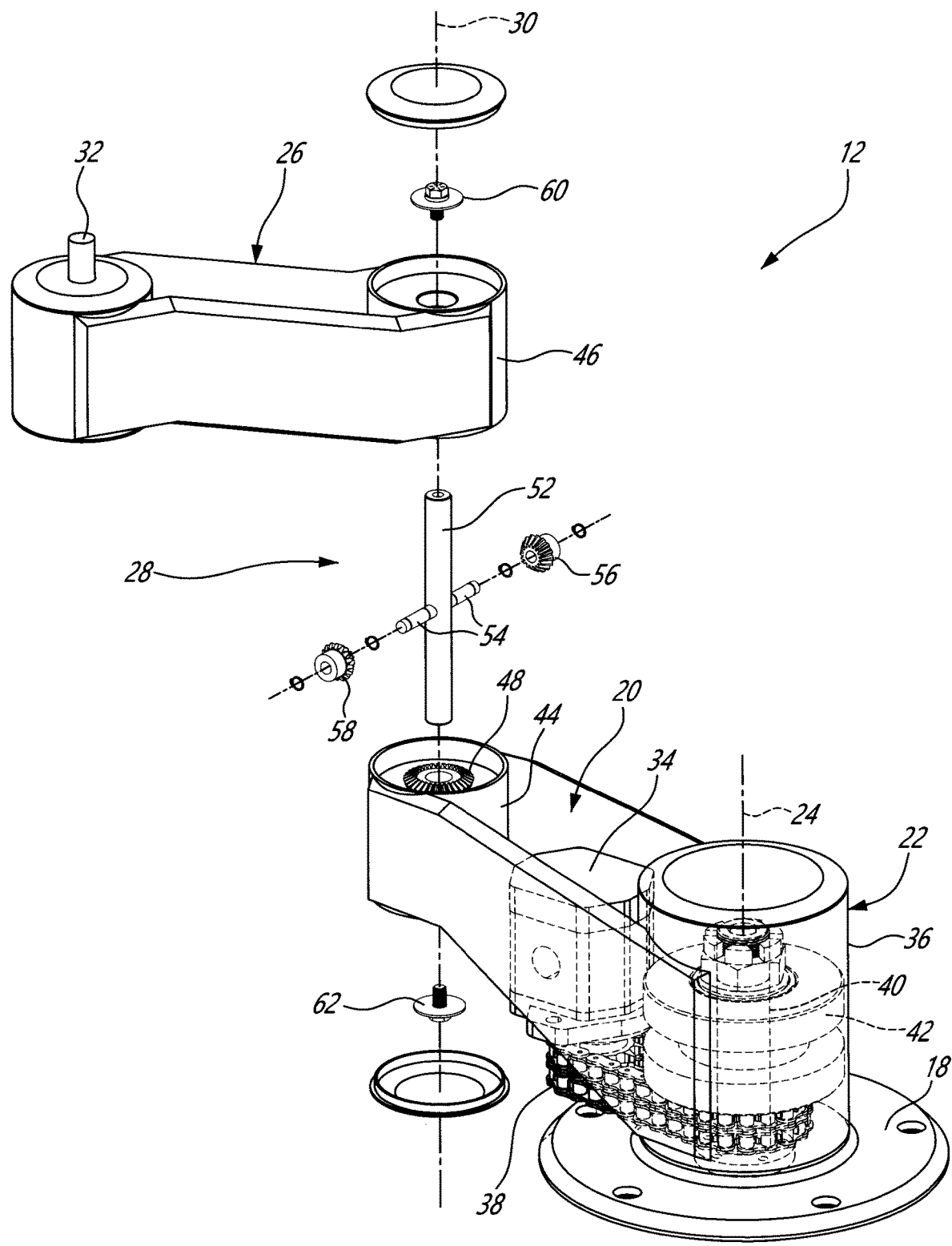
FIG. 5 is a partially exploded perspective view illustrating the gearing assembly of the first and second pivots.

As can be better seen from FIGS. 3 and 5, the controllable damping and locking mechanism 34 is connected to the first pivot assembly 22 via a double chain 38 anchored to sprockets (not shown) mounted to a centrally located fixed shaft 40 of the first pivot 22. This shaft 40 and the sprockets (not shown) are fixedly and non-rotatably mounted to the anchor plate 18.

The cylindrical body 36, defining the pivotable portion of the first pivot assembly 22, is mounted to the shaft 40 via bearings (not shown) provided between the shaft 40 and a support 42, which is fixedly mounted to the body 36.

One skilled in the art will understand that since the controllable damping and locking mechanism 34 is fixedly mounted to the proximate arm 20, should the mechanism 34 be so controlled as to prevent rotation of the double chain 38, the cylindrical body 36 cannot pivot about the fixed shaft 40, effectively locking the multi-pivot seat base assembly 12.

Of course, the double chain 38 and associated sprockets (not shown) could be replaced by other suitable means of transmitting movement, such as belts and pulleys, for example.

One skilled in the art will understand that the controllable damping and locking mechanism 34 could be hydraulic, electrical or pneumatic but that it should be designed with fail safes against power failures.

The second pivot assembly 28 includes a bottom fixed part 44 mounted to the distal end of the proximate arm 20 and a top pivotable part 46 mounted to the proximate end of the distal arm 26.

Figure 4:
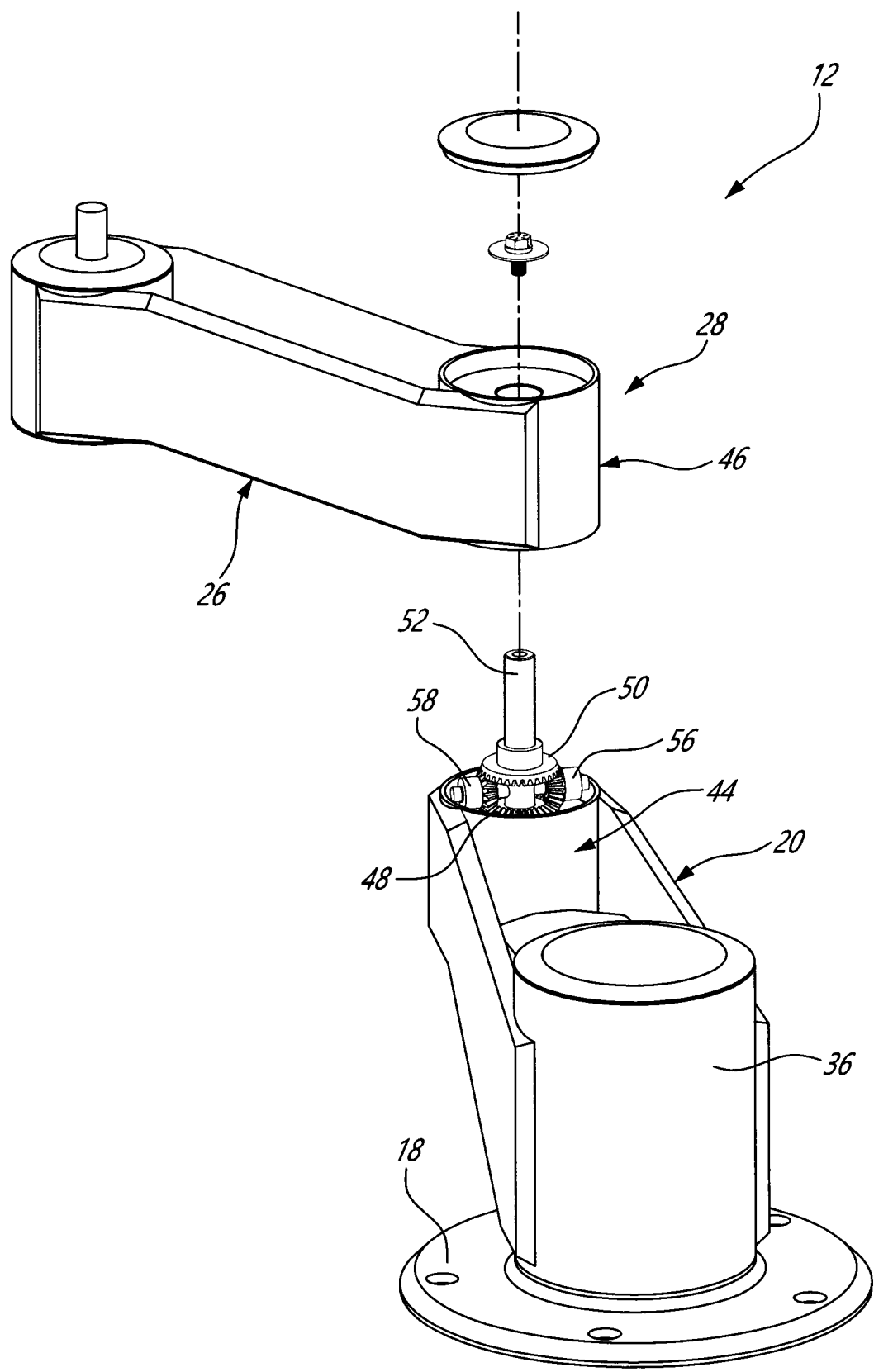
FIG. 4 is a partially exploded perspective view of the multi-pivot base of FIG. 2.

FIGS. 4 and 5 illustrate the second pivot assembly 28 in exploded views.

More specifically, FIG. 5 shows that the fixed part 44 includes a first bevel gear 48 that is fixedly mounted to the casing of the bottom fixed part and therefore to the proximate arm 20. A second bevel gear (see 50 in FIG. 4) is similarly fixedly mounted to the pivotable part 46 and therefore to the distal arm 26. First and second bevel gears 48 and 50 are so configured as to receive a shaft 52 that is fixedly mounted to the bottom fixed part 44 and to which the pivotable part 46 is so mounted that it can pivot.

One skilled in the art will understand that the pivotable part 46 includes bearings (not shown) allowing the shaft 52 to freely pivot therein.

The shaft 52 includes a transversal short shaft 54, to which are mounted secondary bevel gears 56 and 58.

Fasteners 60 and 62 are used to assemble the second pivot assembly 28.

FIG. 4 illustrate the interconnection of the bevel gears 48, 50, 56 and 58.

Since bevel gears 48 and 50 are respectively fixedly mounted to the fixed and pivotable parts 44 and 46 of the second pivot assembly 28, one skilled in the art will understand that a pivoting action of the pivotable part 46 about the shaft 52 causes the rotation of the secondary bevel gears 56 and 58 that, in turn causes the pivot action of the proximate arm 20 about the first pivot axis 24. Accordingly, the bevel gears 48, 50, 56 and 58 can be viewed as a pivot linking mechanism since they are so configured that a pivotal movement of the distal arm about the second pivot assembly causes a pivotal movement of the proximate arm about the first pivot assembly.

Indeed, since the bevel gear 48 is fixedly mounted at the distal end of the proximate arm 20 and the pivot action of the distal arm 26 causes rotation of the secondary gears 56 and 58 that cannot rotate about the second axis 30 since the shaft 52 is not rotatable with respect to the fixed part 44, the rotation of the gears 56 and 58 onto the gear 48 causes a rotation of the proximate arm 20 about the first axis 24.

This is interesting since in the event that the controllable damping mechanism 34 is so controlled as to prevent any pivoting movement of the proximate arm 20 about the first pivot axis 24, it also simultaneously prevents movement of the distal arm 26 about the second pivot axis 30.

Accordingly, in an emergency situation, a controller (not shown) may so control the multi-pivot seat base assembly as to prevent any movement thereby.

Furthermore, the controllable damping and locking mechanism 34 may be so controlled by the user, using inputs to the controller (not shown) to vary the resistance to movement according to the user's preference.

One skilled in the art will understand that the multi-pivot seat base assembly 12 may also include sensors (not shown) that supply position data of the various pivot assemblies to the controller.

For safety purpose, the controller (not shown) may monitor the multi-pivot seat base assembly 12 to ensure that its power supply is operating adequately and take safety measures, such as, for example, automatically locking the seat base assembly 12, should power fail.

Figure 6:
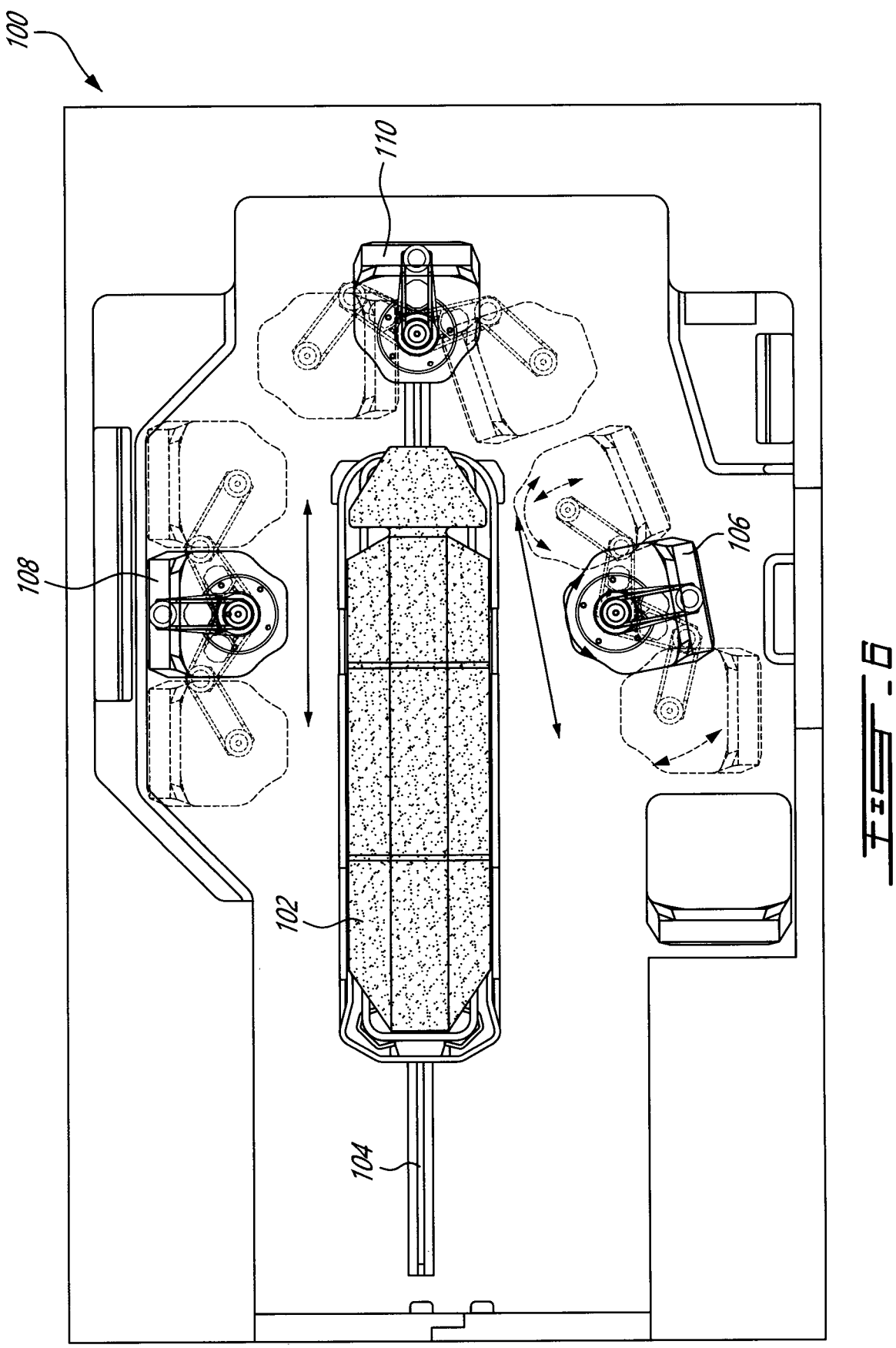
FIG. 6 is a top plan view of the interior of an ambulance provided with three seats each mounted to a multi-pivot base as illustrated in FIG. 1; each seat being shown in its neutral position and in two possible positions.
Figure 7:
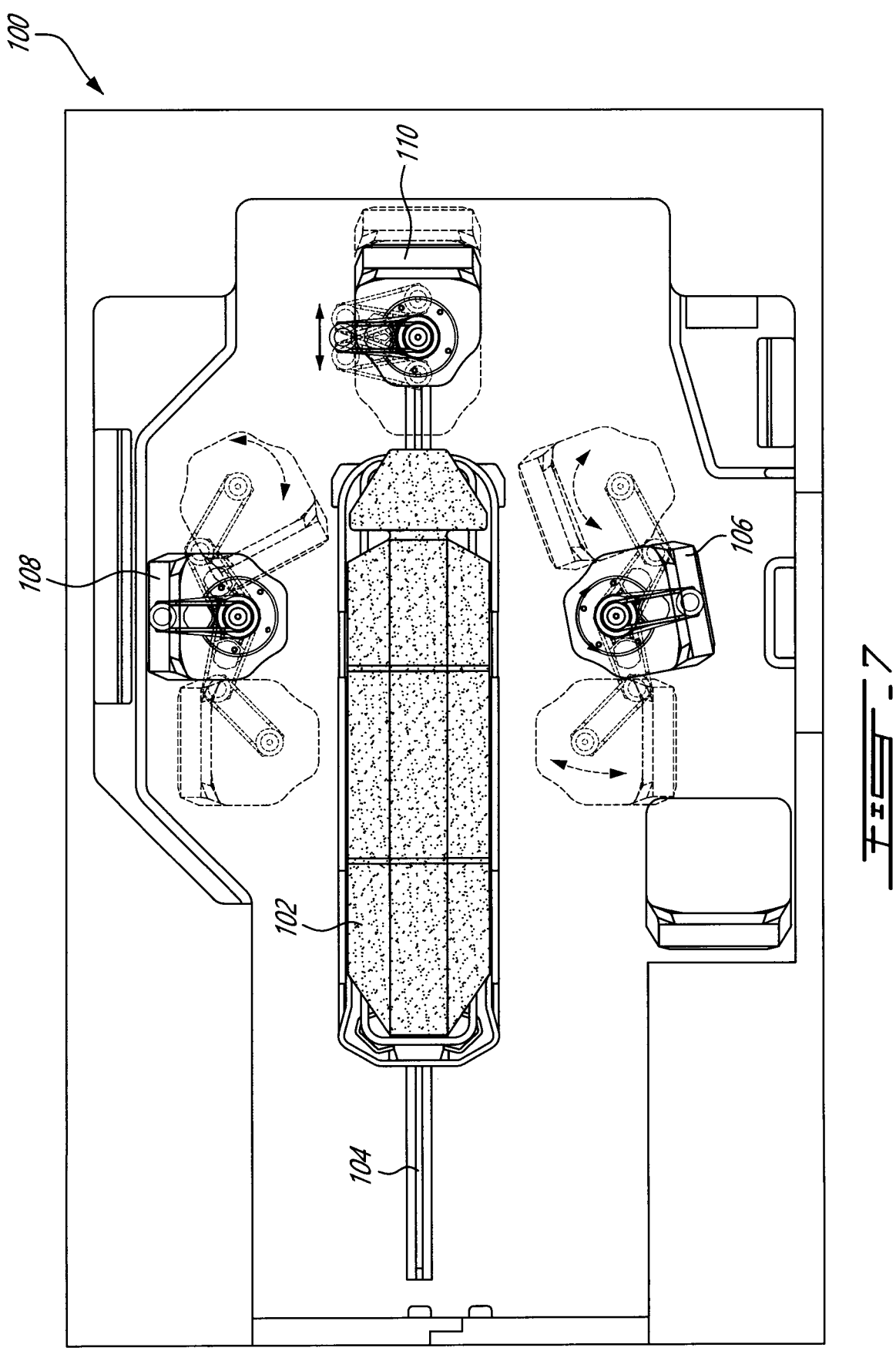
FIG. 7 is a top plan view similar to FIG. 6 but illustrating the three seats in alternate possible positions.
Figure 8:
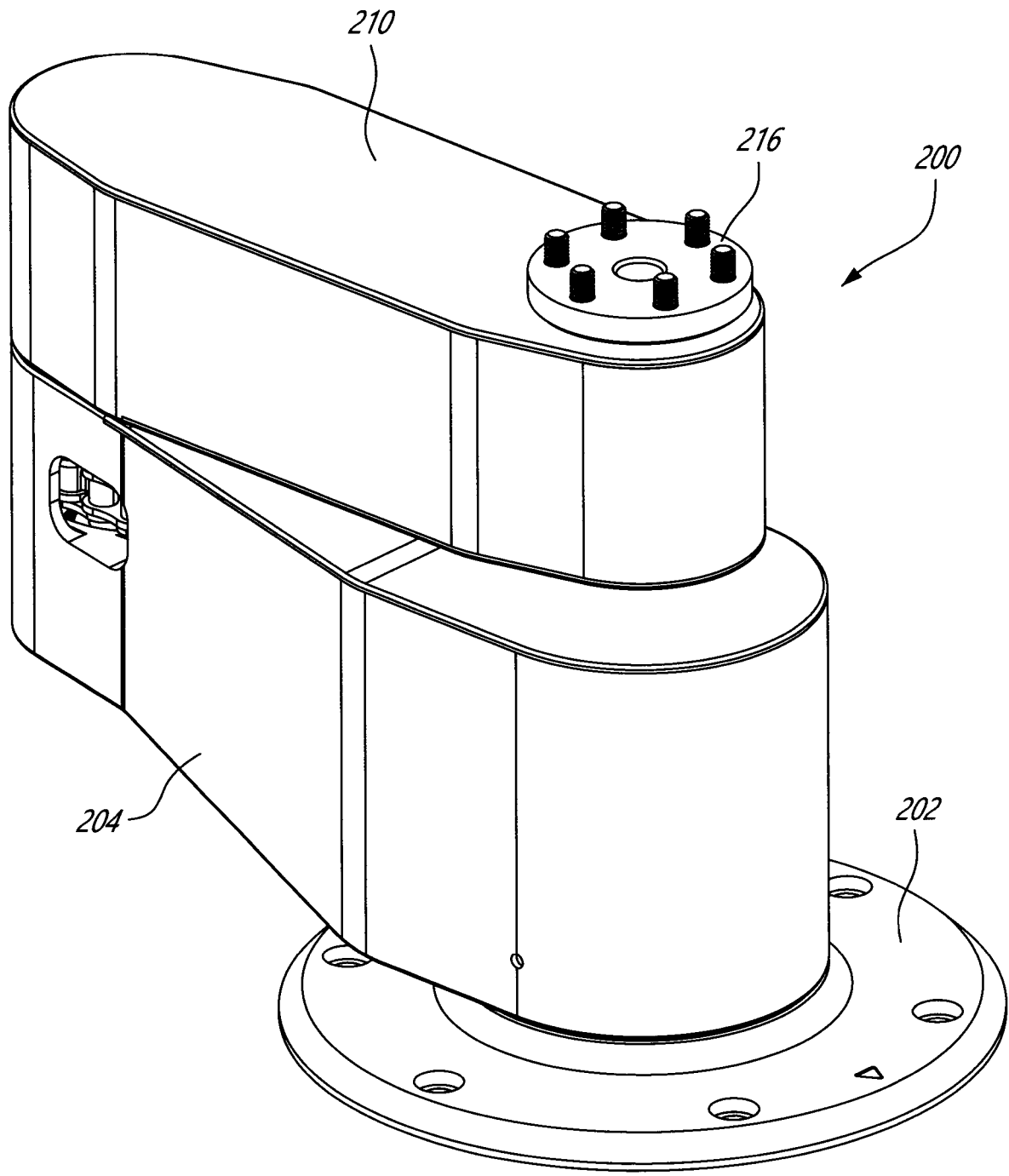
FIG. 8 is a perspective view of a multi-pivot base assembly according to a second illustrative embodiment.
Figure 9:
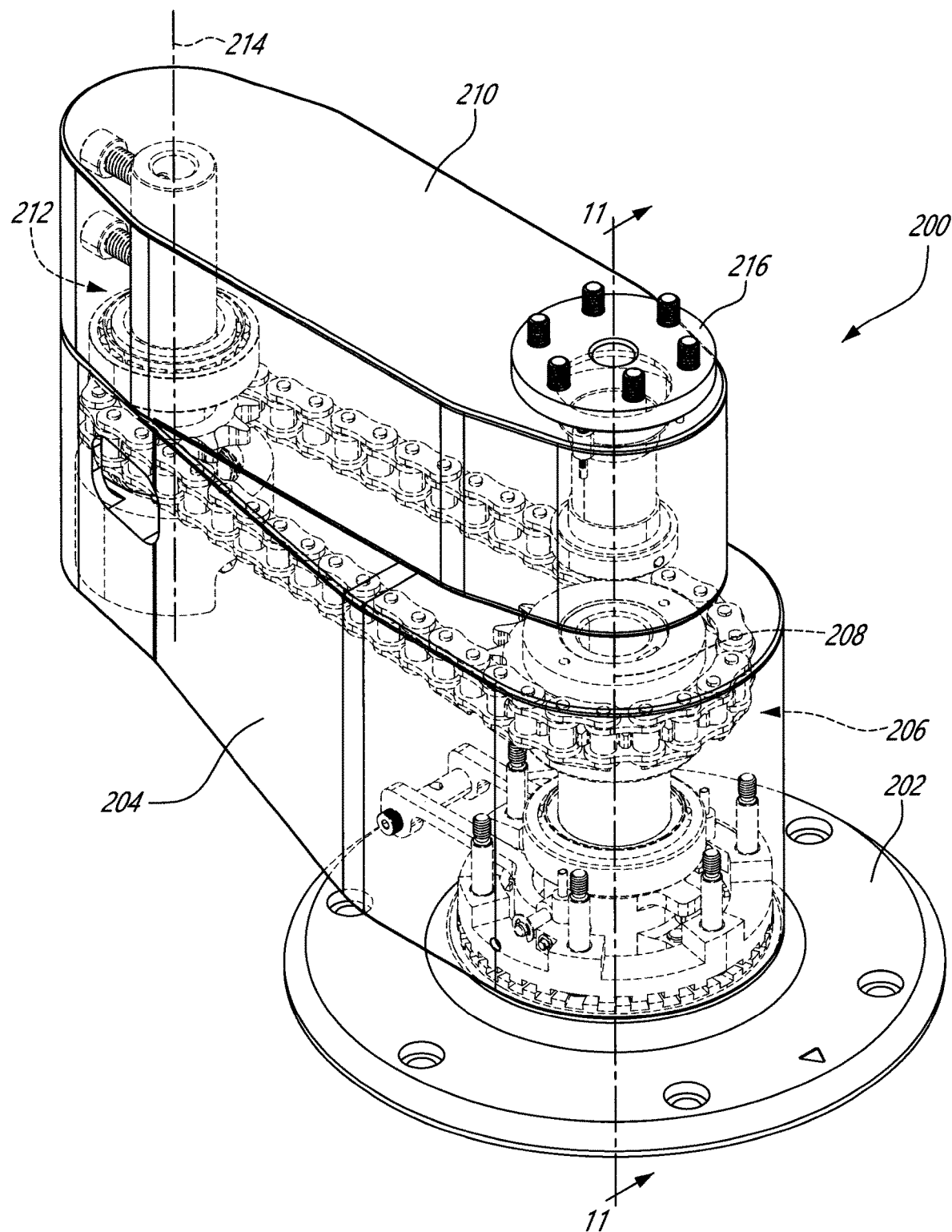
FIG. 9 is a perspective view similar to FIG. 8, illustrating, in dashed lines, the internal parts of the multi-pivot base assembly.

Turning now to FIGS. 6 and 7 of the appended drawings, possible movements of seats mounted to multi-pivot char base assemblies will be illustrated in the context of an ambulance.

The interior space of the ambulance 100 is shown in a top plan view. A conventional stretcher 102 is mounted to a conventional but elongated rail 104 to allow the conventional stretcher 102 to be positioned farther in the ambulance 100. The ambulance 100 includes three seats mounted to multi-pivot seat base assemblies. These seats are generally referred to as the curb side seat 106, the street side seat 108 and the head seat 110.

The elongated rail 104 allows the curb side seat 106 and the street side seat 108 to be positioned between the wheel wells (not shown) of the vehicle to thereby be on a flat portion of the ambulance floor and enable a greater freedom of positioning of the seat bases. This seat positioning also allows the user to attend to the core and head of the patient present in the stretcher 102, thanks to the forward positioning of the stretcher 102 made possible by the elongated rail 104.

FIGS. 6 and 7 each shows 3 possible positions for each of the seats 106, 108 and 110. As seen from these figures, the multi-pivot bases can be used to move towards and away from the stretcher, to move laterally and to turn around to reach equipment mounted onto horizontal surfaces or walls of the ambulance, as shown by the various arrows.

One skilled in the art will understand that even though three seats provided with a multi-pivot seat base mechanism as described herein are shown in FIGS. 6 and 7, only one or two of the seats shown could be provided with such a multi-pivot seat base assembly.

Similarly, while FIGS. 6 and 7 show an ambulance configuration where an elongated rail 104 allows the stretcher 102 to be positioned in a generally central location of the ambulance compartment 100, the multi-pivot seat base described herein could be used in a conventional ambulance layout and in other vehicles.

Turning now to FIGS. 8 to 14 of the appended drawings, multi-pivot seat base mechanism 200 according to a second illustrative embodiment will be described. Since the mechanism 200 is very similar to the mechanism 12 illustrated in FIGS. 1 to 7 and discussed hereinabove, only the differences therebetween will be described in detail, for concision purpose.

Generally stated, two main differences exist between the mechanism 200 and the mechanism 12 of FIGS. 1 to 7. The first difference is related to the interconnection between the first and second pivot assemblies and the elements that cause the proximate arm to pivot about the first pivot axis when the distal arm pivots about the second pivot axis, as will be discussed hereinbelow. The second difference involves the controllable damping and locking mechanism.

The multi-pivot seat base mechanism 200 includes a generally circular anchoring plate 202, configured to be fixedly mounted to the floor, a proximate arm 204 so mounted to a first pivot assembly 206 as to be pivotable about a first pivot axis 208, a distal arm 210 so mounted to a second pivot assembly 212, provided between the proximate and distal arms, as to be pivotable about a second pivot axis 214. The free end of the distal arm 210 includes a seat receiving element 216.

Figure 10:
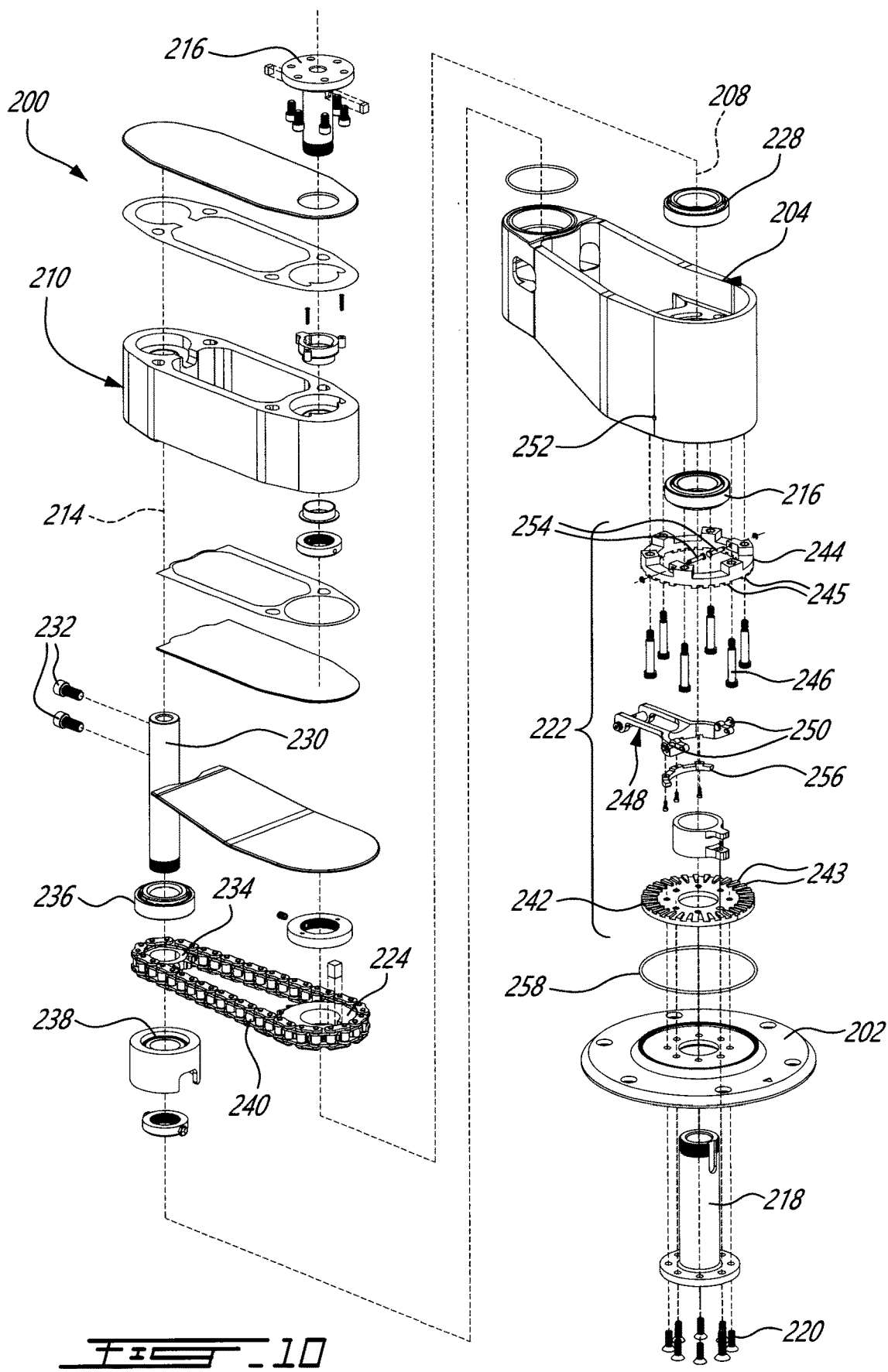
FIG. 10 is an exploded perspective view of the multi-pivot base assembly of FIG. 8.
Figure 11:
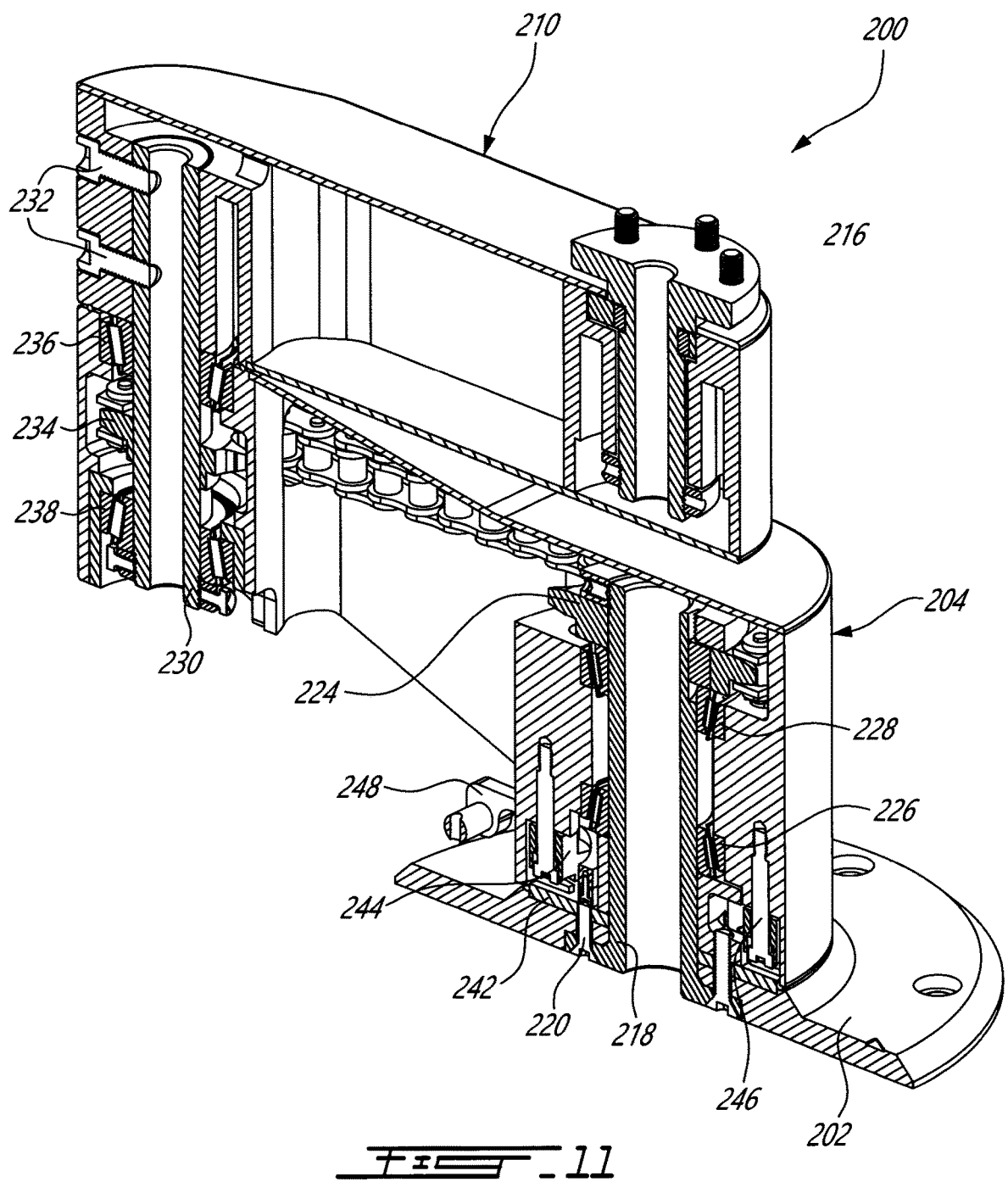
FIG. 11 is a sectional view taken along line 11-11 of FIG. 9.

As can be better seen from FIG. 10, the first pivot assembly 206 includes a fixed shaft 218 mounted to the plate 202 via fasteners 220, a controllable damping and locking mechanism 222, and a first sprocket 224, fixedly mounted to the fixed shaft 218 by a key and keyway assembly. The fixed shaft 218 defining the first pivot axis 208.

The proximate end of the proximate arm 204 is pivotably mounted to the fixed shaft 218 via bearings 226, 228.

The second pivot assembly 212 includes a shaft 230 is fixedly mounted to the proximate end of the distal arm 210 via fasteners 232 provided in the top portion of the shaft 230. A second sprocket 234 is mounted to the shaft 230, for example by welding, so as to be rotatable therewith.

The bottom portion of the shaft 230 is pivotally mounted to the distal end of the proximate arm 204 via bearings 236, 238. The distal arm 210 may therefore pivot about the second pivot axis 214 defined by the shaft 230.

A chain 240 interconnects the first and second sprockets 224 and 234. Accordingly, a pivotal movement of the distal arm 210 about the second pivot axis 214 causes a corresponding pivotal movement of the proximate arm 204 about the first pivot axis 208. Accordingly, the first and second sprockets 224 and 234 and the chain 240 can be viewed as a pivot linking mechanism since they are so configured that a pivotal movement of the distal arm about the second pivot assembly causes a pivotal movement of the proximate arm about the first pivot assembly Indeed, since the second sprocket 234 is fixedly mounted to the shaft 230, it pivots with it when the distal arm 210 pivots about axis 214. This pivotal movement of the second sprocket 234 creates a force in the chain 240 that tries to pivot the first sprocket 224. However, since the first sprocket 224 is fixedly mounted to the fixed shaft 218, it cannot pivot, and this force is transferred to the proximate arm 204 that pivots about the first pivot axis 208 since the second sprocket 234 is mounted in the distal end of the proximate arm 204.

As can be better seen from FIG. 10, the controllable damping and locking mechanism 222. While the controllable damping and locking mechanism 34 of the assembly 12 of FIGS. 1 to 7 combines the functions of damping and locking, the mechanism 222 of the assembly 200 separates these two functions.

Indeed, the mechanism 222 includes a locking sub-mechanism in the form of a claw coupling having a fixed part 242 provided with upwardly facing claws 243 and a movable part 244 provided with downwardly facing claws 245. As can be better seen from FIG. 11, the fasteners 220 securing the shaft 218 to the base 202 extend past the base 202 and secure the fixed part 242 to the base 202. The movable part 244 is so mounted to the proximate end of the proximate arm 204 via fasteners 246 so as to be movable along the axis 208.

The controllable damping and locking mechanism 222 also includes a fork actuator 248 which is so mounted to the proximate end of the proximate arm 204 via pins 250 that engage apertures 252 of the arm 204 as to be pivotable about the axis defined by the pins 250. The fork 248 is linked to the movable part 244 via pivot pins 254.

As will be described hereinbelow, a pivotal upward movement of the fork 248 brings the movable part 244 in engagement of the fixed part 242 of the claw coupling.

The fork 248 also includes a generally C-shaped pad 256 made of a plastic material allowing it to embody the damping function of the mechanism 222. Indeed, the pad 256 is so mounted to the underside of the fork 248 that a pivotal downward movement of the fork 248 bring the pad 256 in contact with the flat portion of the fixed portion 242 of the claw coupling. The pad 256 may thus be viewed as a friction inducing means between the proximate end of the proximate arm 204 and the first shaft 218 since the fixed portion 242 of the claw coupling, the base 202 and the shaft 218 are fixedly interconnected via the fasteners 220.

As a non-limiting example, the pad 256 could be made of polyurethane.

The pivotal movements of the fork 248 is done by an actuator (not shown) that it controlled by a controller (also not shown). The technology used in this actuator can be electrical, hydraulic of pneumatic, depending on the technologies available in the vehicle. It is believed within the reach of one skilled in the art to select an appropriate actuator.

One skilled in the art will notice that a seal, in the form of an O-ring 258 is provided between the proximate arm 204 and the base 202 to prevent foreign matter to enter.

Figure 12:
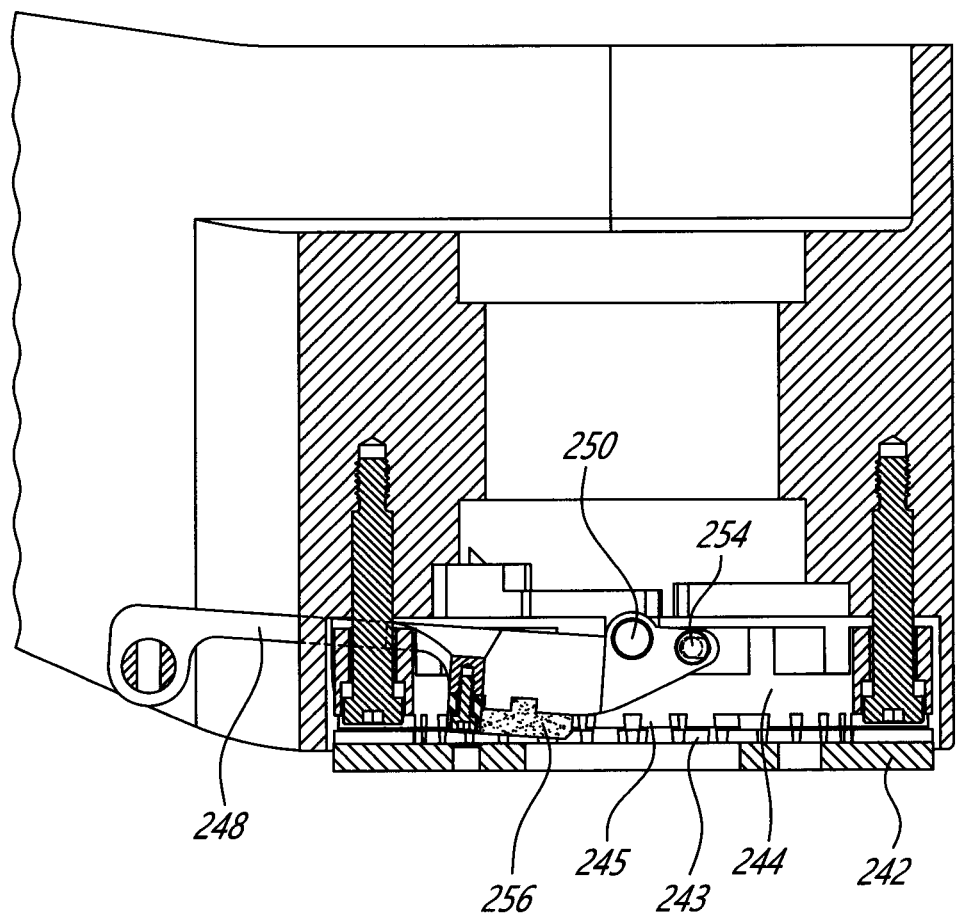
FIG. 12 is a sectional view showing the combined damping and locking mechanism in a free-wheeling position.
Figure 13:
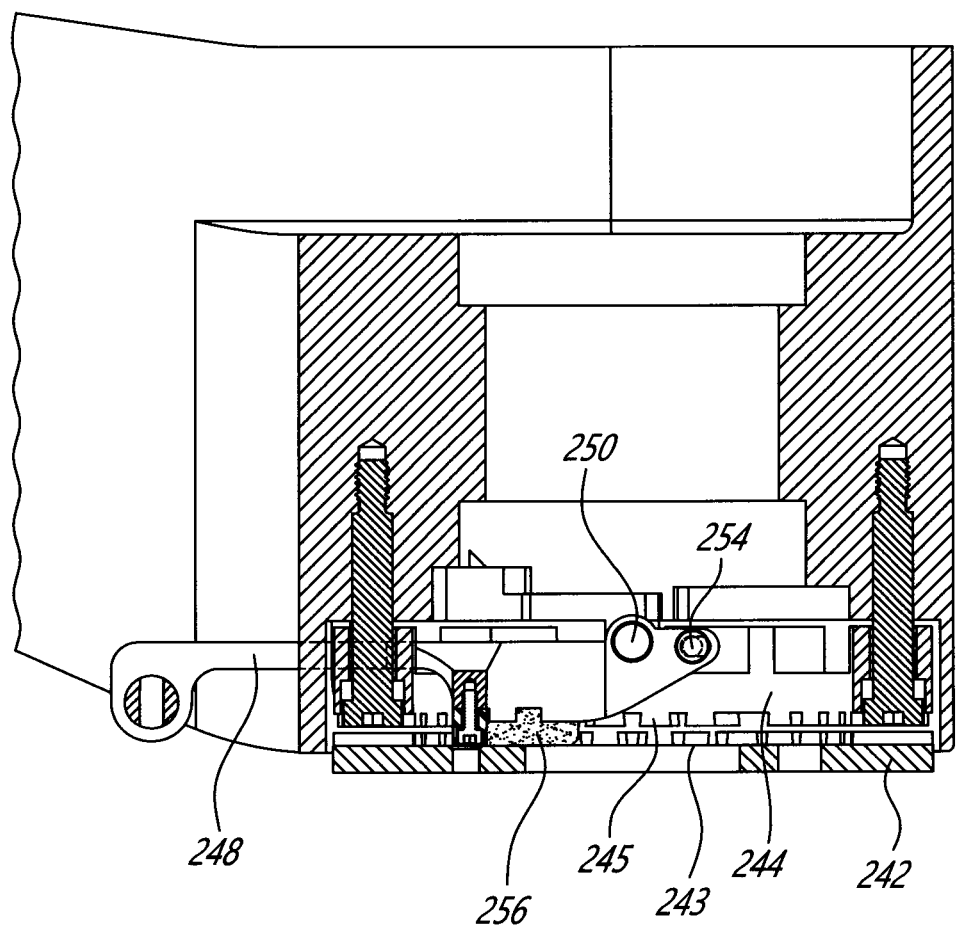
FIG. 13 is a sectional view showing the combined damping and locking mechanism in a friction inducing position.
Figure 14:
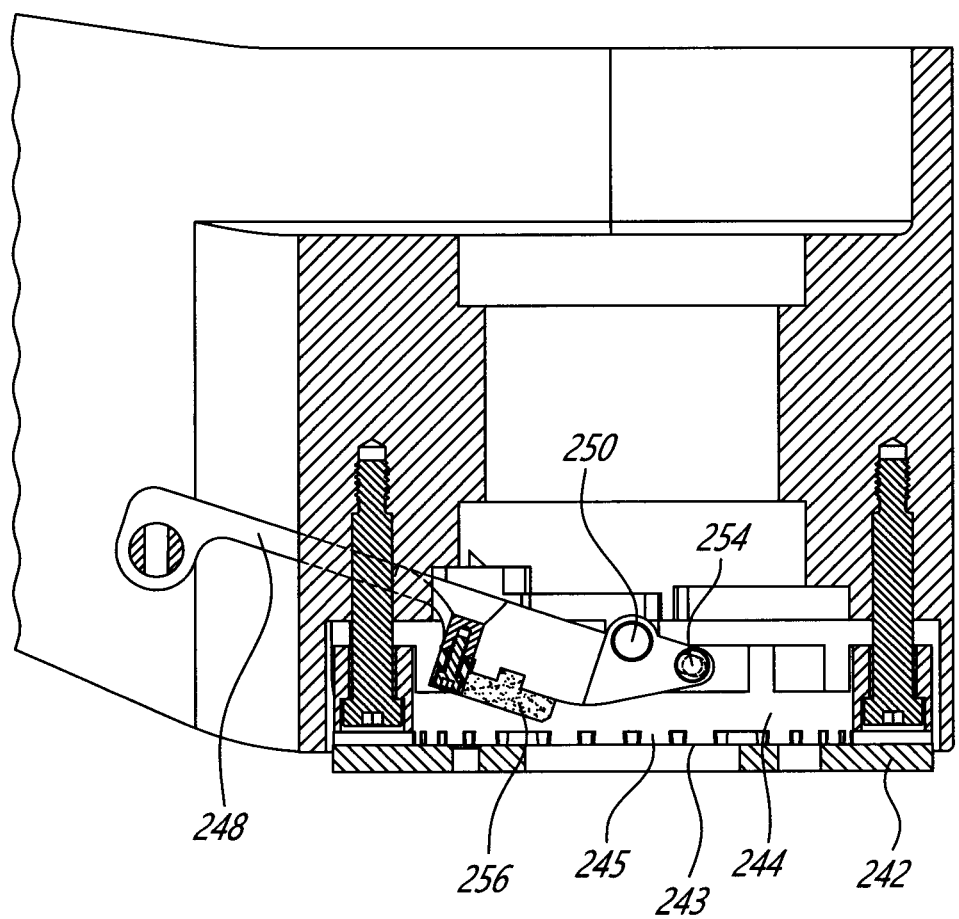
FIG. 14 is a sectional view showing the combined damping and locking mechanism in a locking position.

Turning now to FIGS. 12 to 14 of the appended drawings, the operation of the controllable damping and locking mechanism 222 will be described.

FIG. 12 illustrates the fork 248 in a neutral position. Indeed, when the fork 248 is in that position, the claws 243 and 245 are not in an engaged configuration and the pad 256 does not contact the fixed part 242.

FIG. 13 shows the fork 248 when it has been pivoted downwardly about pins 250 so that the pad 256 is in contact with the fixed part 242. The mechanism 222 is then in a damping position.

One skilled in the art will understand that since the force applied by the actuator to move the fork 248 be controllable, the damping effect of the pad contacting the fixed part 242 is also variable. For example, a user could have a control over the pressure applied and therefore the force required to manually pivot the seat base.

FIG. 14 shows the fork 248 when it has been pivoted upwardly about pins 250 so that the pad claws 243 and 245 are meshed, thereby locking any pivotal movement of the multi-pivot seat base assembly.

One skilled in the art will understand that since the first and second pivot assemblies 206 and 212 are linked by a chain looping about two sprockets, the path described by the distal end of the distal arm depends on the characteristics of the chain and of the sprockets. It is believed to be within the skills of those skilled in the art to determine these characteristics depending on the desired path.

It is also to be noted that the multi-pivot seat base mechanism 200 also includes many elements to ensure that the various mechanical parts are properly spaced and maintained in their desired positions. These elements are believed well known to those of ordinary skills in the art and will not be discussed further herein.

Figure 15:
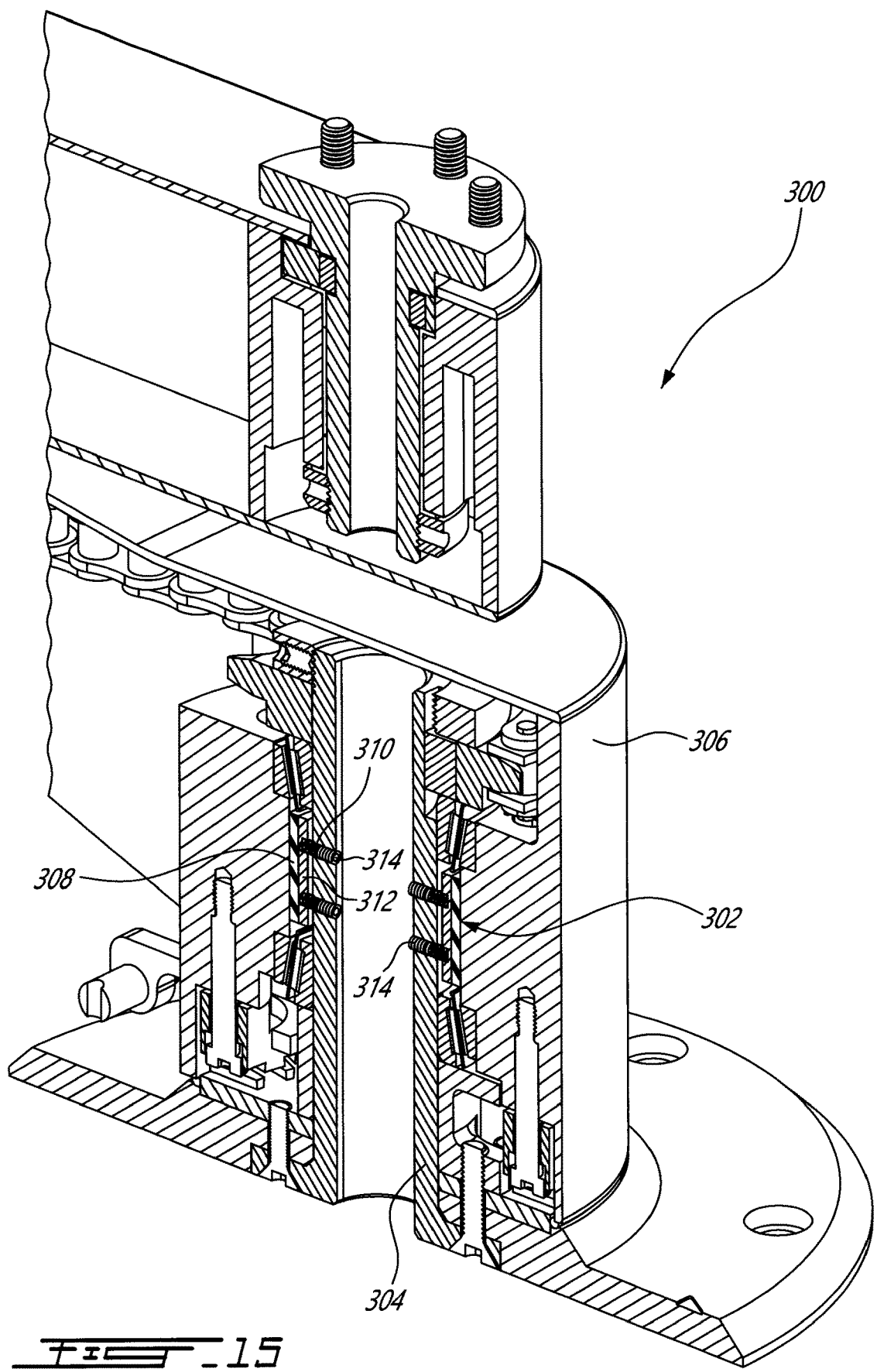
FIG. 15 is a sectional perspective view of a multi-pivot base assembly according to a third illustrative embodiment where the damping and the locking mechanisms are separated.

Turning now to FIG. 15 of the appended drawings, a multi-pivot seat base mechanism 300 according to a third illustrative embodiment will be described. Since the mechanism 300 is very similar to the mechanism 200 illustrated in FIGS. 8 to 14 and discussed hereinabove, only the differences therebetween will be described in detail, for concision purpose.

The difference between the mechanism 300 and the mechanism 200 is the damping assembly which is completely separated from the locking mechanism.

Indeed, while the locking mechanism of the assembly 300 is identical to that of mechanism 200, the damping mechanism is not associated with the fork controlling the breaking mechanism.

More specifically, the damping mechanism 302 is provided between the fixed shaft 304 and the pivoting proximate end of the proximate arm 306 and includes damping pads 308 (two shown in FIG. 15) that are urged against the arm 306 by springs 310 pushing backer plates 312 secured to the pads 308. Fasteners such as set screws 314 allow installation, maintenance and force adjustments to the damping mechanism 302. The pads 308 may thus be viewed as friction inducing means between the proximate end of the proximate arm 306 and the first shaft 304.

One skilled will understand that the damping mechanism 302 is always in operation and, could include variable compression features (not shown) that allow the damping level to be controllable by the user.

Should one desire a controllable damping mechanism similar to the mechanism 302, the springs 310 could be replaced by a linear pushing actuator (not shown) provided inside the shaft 304. Should that be the case, a controller (not shown) could control the damping level in some instances, such as a severe braking action or a high speed cornering, for example.

Figure 16:
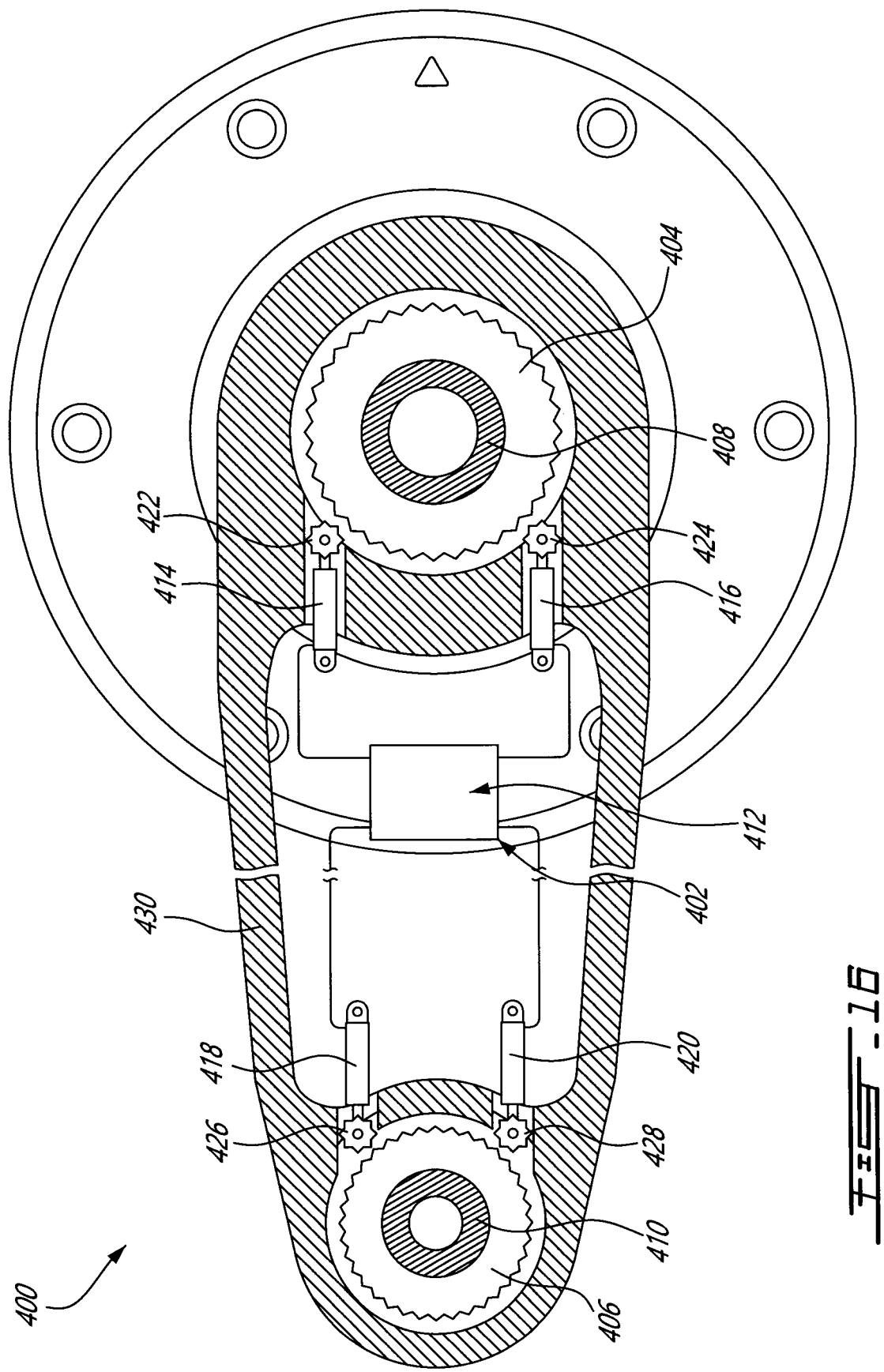
FIG. 16 is a top plan view of a multi-pivot base assembly according to a fourth illustrative embodiment provided with a locking mechanism that stops movements on two pivots.
Figure 17:
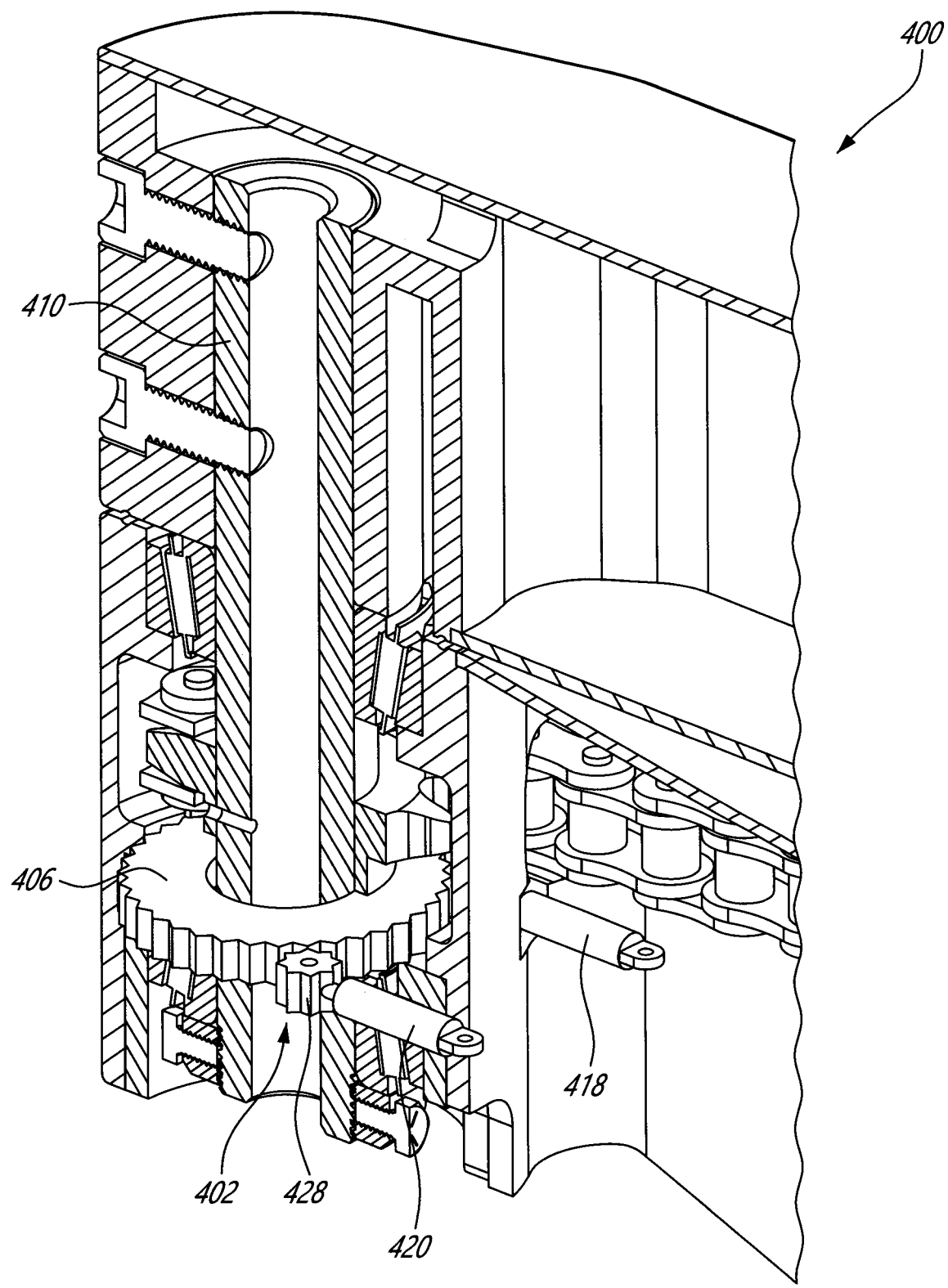
FIG. 17 is a perspective view of the locking mechanism of the second pivot of the assembly of FIG. 16.

Turning now to FIGS. 16 and 17 of the appended drawings, a multi-pivot seat base mechanism 400 according to a fourth illustrative embodiment will be described. Since the mechanism 400 is very similar to the mechanisms 200 and illustrated in FIGS. 8 to 15 and discussed hereinabove, only the differences therebetween will be described in detail, for concision purpose.

The difference between the mechanism 400 and the mechanism 200 is the locking mechanism 402 which is completely separated from the damping mechanism.

Indeed, the locking mechanism 402 of the assembly 400 is a one-time use locking mechanism that is triggered by a controller (not shown) when sensors (also not shown) detect a collision.

The one-time use locking assembly 402 includes first and second sprockets 404 and 406 respectively fixedly mounted to first and second shafts 408 and 410, and actuator assembly 412 provided with four (4) pistons 414-420 each provided with a locking sprocket 422-428 facing one of the sprockets 404 and 406. As can be seen from FIG. 16, the actuator assembly 412 is fixedly mounted to the proximate arm 430.

When the actuator assembly 402 receives a signal from a controller (not shown) that a collision or other catastrophic event takes place, the pistons 414-420 are forcefully extended generally tangentially towards the sprockets 404 and 406 and the locking sprockets 422-428 forcefully contact the sprockets 404 and 406 and are jammed between the sprockets 404, 406 and the portions of the proximate arm 430 adjacent these sprockets. Accordingly, the arms of the multi-pivot seat base mechanism 400 are definitively prevented from pivoting.

Alternatively, the controller (not shown) of the actuator assembly 402 can be configured to extend only the pistons facing one of the sprockets 404 and 406. Since these are chain linked, this would be sufficient, in most cases, to prevent further pivoting of the arms.

One skilled in the art will understand that two pistons and locking sprockets are provided for each shaft to ensure that, once the pistons have been deployed, the arms cannot be pivoted in either direction.

One skilled in the art will also understand that the positioning of the sprockets 404 and 406 could be different than illustrated as long as they are attached to both shafts 408 and 410. Similarly, the shape of the locking sprockets could be different as long as they are adequately shaped as to become jammed when brought into contact with the sprockets 404 and 406.

Finally, one skilled in the art will understand that the pistons 414-420 could be replaced by other mechanisms that could perform the same function. As a non-limiting example, a spring loaded cam could replace the pistons.

Figure 18:
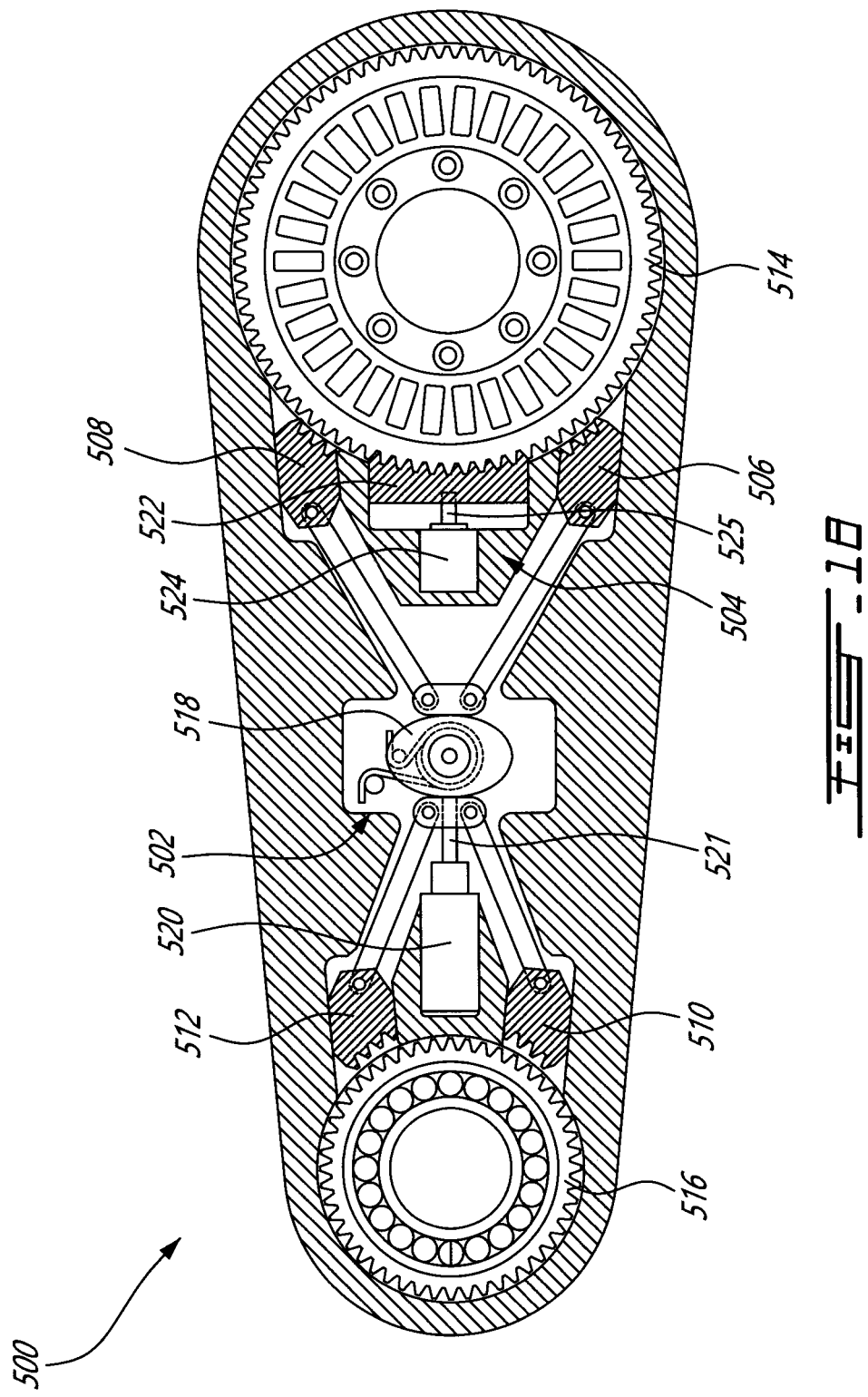
FIG. 18 is a top plan view of a multi-pivot base assembly according to a fifth illustrative embodiment provided with an engaged temporary locking mechanism and a disengaged permanent locking mechanism.
Figure 19:
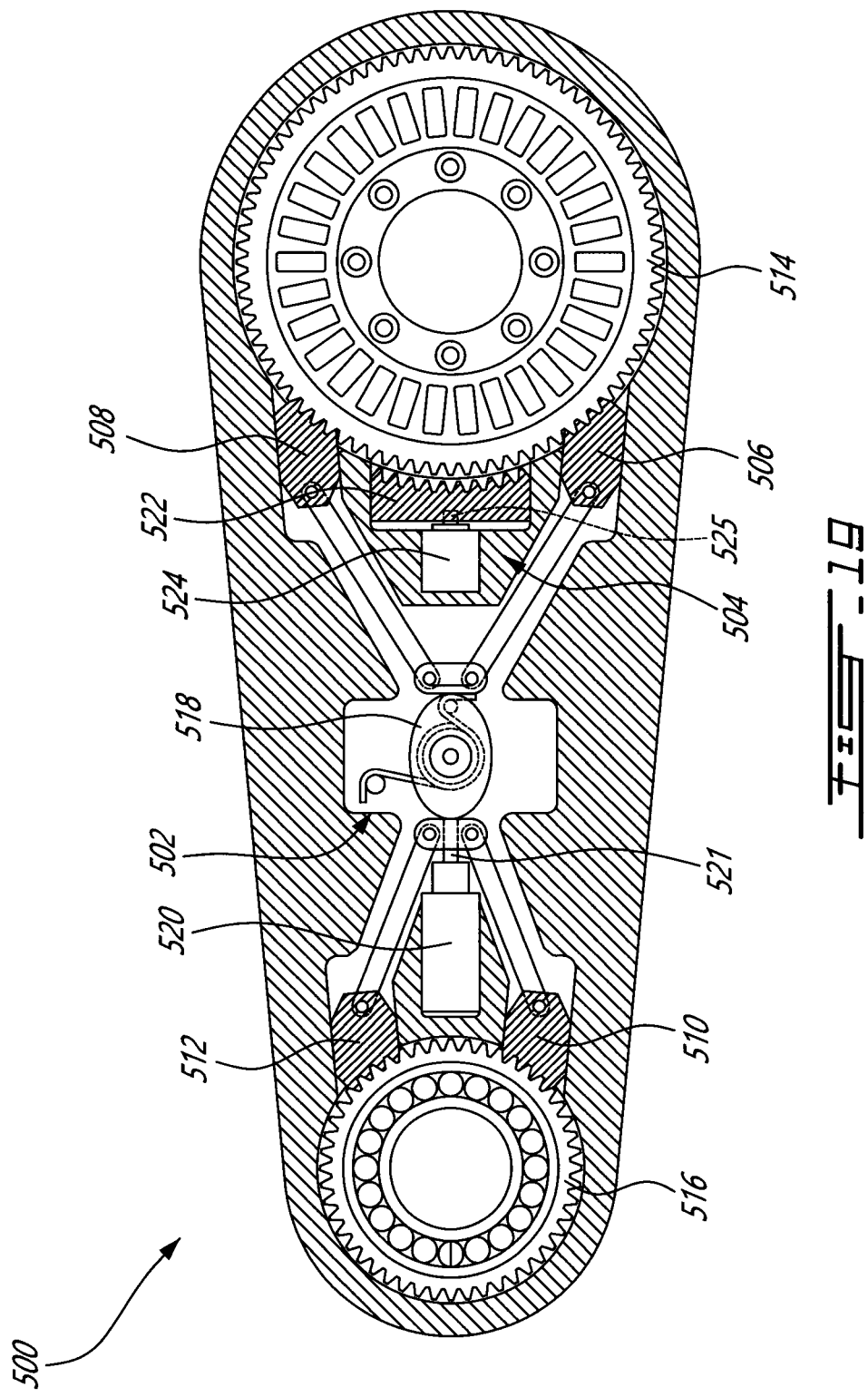
FIG. 19 is a top plan view similar to FIG. 18 illustrating a disengaged temporary locking mechanism and an engaged permanent locking mechanism.

Turning finally to FIGS. 18 and 19 of the appended drawings, a multi-pivot seat base mechanism 500 according to a fifth illustrative embodiment will be described. Since the mechanism 500 is very similar to the mechanisms 400 and illustrated in FIGS. 16 and 17 and discussed hereinabove, only the differences therebetween will be described in detail, for concision purpose.

The main difference between the mechanism 500 and the mechanism 400 is the fact that the mechanism 500 includes a permanent locking mechanism 502, operating in a similar manner as the locking mechanism 402 of FIGS. 16 and 17, and a temporary locking mechanism 504.

As mentioned hereinabove, the permanent locking mechanism 502 is similar to the mechanism 402 since it relies on sprocket parts 506-512 that can be brought in forceful contact with sprockets 514 and 516 as discussed hereinabove with respect to FIG. 16.

FIG. 18 illustrates the permanent locking mechanism in a non-locking position. However, instead of pistons, a centrally located spring loaded cam 518 is maintained in such a loaded position by an actuator 520 (see piston 521). When the cam 518 is in this position, the sprocket parts 506-512 are maintained away from the sprockets 514-516. When a signal is sent to the actuator 520, for example when an accident is detected, it retracts its piston 521 (see FIG. 19), the spring loaded cam 518 is released and the sprocket parts 506-512 are forcefully moved tangentially towards and brought into contact with the sprockets 514 and 516 to prevent further rotation thereof as can be seen in FIG. 19.

This is a permanent locking mechanism since it is believed that there is a risk that parts deformation may occur that would render the mechanism 502 operable only once, when an accident is detected.

One skilled in the art will understand that the electrically controlled actuator 520 could be replaced by other actuators, mechanical or otherwise, that would react when an accident is detected.

The temporary locking mechanism 504 is shown in its locking position in FIG. 18 and in its non-locking position in FIG. 19. The mechanism 504 is intended to be actionable when a controller (not shown) detects a severe braking action or a high speed cornering, for example. The mechanism 504 includes a sprocket portion 522 and an actuator 524 provided with a piston 525. The sprocket portion 522 faces the sprocket 514 and the activation of the actuator 524 brings the sprocket portion 522 and the sprocket 514 in contact (see FIG. 18). Since the movement of the sprocket portion 522 is radial with respect to the sprocket 514, it is believed that the risks of parts deformation is minimized and that the temporary locking mechanism 504 can be used repeatably.

Optionally, the user could be provided with means to activate the temporary locking mechanism 504 when desired.

One skilled in the art will understand that the locking sprockets 422-426 and the sprocket elements 506-512 and 522 could be replaced by suitable locking elements that can interconnect with the sprockets to prevent pivotal movements of the arms about the shafts.

While the multi-pivot seat base mechanisms shown herein are provided with two pivots, one skilled in the art could design a similar seat base mechanism with more or less than two pivots while following the teachings of the present application.

It will be readily understood by those skilled in the art that the various features of the embodiments discussed hereinabove and shown in the appended drawings could be combined differently depending on the desired requirements of the intended use thereof.

As will be obvious to those skilled in the art, other types of seats could be mounted to the multi-pivot seat base assemblies described herein.

It is to be understood that the multi-pivot seat base assembly is not limited in its application to the details of construction and parts illustrated in the accompanying drawings and described hereinabove. The multi-pivot seat base assembly is capable of other embodiments and of being practiced in various ways. It is also to be understood that the phraseology or terminology used herein is for the purpose of description and not limitation. Hence, although the multi-pivot seat base assembly has been described hereinabove by way of illustrative embodiments thereof, it can be modified, without departing from the spirit, scope and nature thereof.

What is claimed is:

1. A multi-pivot seat base assembly including:
   a first pivot assembly having a first shaft mountable to a floor;
   a proximate arm having a proximate end pivotally mounted to the first shaft of the first pivot assembly and a distal end;
   a distal arm having a proximate end and a distal end provided with a seat receiving element;
   a second pivot assembly pivotally interconnecting the distal end of the proximate arm and the proximate end of the distal arm; the second pivot assembly including a second shaft;
   a pivot linking mechanism so configured that a pivotal movement of the distal arm about the second pivot assembly causes a pivotal movement of the proximate arm about the first pivot assembly;
   a damping mechanism connected to at least one of the first and second pivot assemblies; and
   a controllable locking mechanism associated with at least one of the first and second pivot assemblies to selectively prevent pivotal movement thereof.

2. The multi-pivot seat base assembly as recited in claim 1, wherein the pivot linking mechanism includes a bevel gear arrangement associated with the second pivot assembly.

3. The multi-pivot seat base assembly as recited in claim 1, wherein the second shaft of the second pivot assembly is fixedly mounted to one of the distal end of the proximate arm and the proximate end of the distal arm and pivotally mounted to the other of the distal end of the proximate arm and the proximate end of the distal arm; the pivot linking mechanism including a first sprocket fixedly mounted to the first shaft, a second sprocket fixedly mounted to the second shaft and a chain interconnecting the first and second sprockets.

4. The multi-pivot seat base assembly as recited in claim 1, wherein the first shaft includes an anchoring plate mountable to the floor and wherein the damping mechanism is associated with the first pivot assembly and wherein the damping mechanism includes friction inducing means provided between the proximate end of the proximate arm and the first shaft.

5. The multi-pivot seat base assembly as recited in claim 4, wherein the friction inducing means are so configured that it is possible to control the amount of friction induced.

6. The multi-pivot seat base assembly as recited in claim 1, wherein the controllable locking mechanism is associated with the first pivot assembly and includes a controllable claw coupling assembly.

7. The multi-pivot seat base assembly as recited in claim 6 wherein the controllable claw coupling assembly includes a fixed part associated with the first shaft and a movable part associated with the proximate end of the proximate arm, the movable part being so associated with the proximate arm as to be movable towards and away from the fixed part for engagement and disengagement therewith.

8. The multi-pivot seat base assembly as recited in claim 1, wherein the controllable locking mechanism includes a sprocket fixedly mounted the first shaft and at least one locking element associated with the proximate end of the proximate arm and movable towards the sprocket for interconnection therewith to therefore lock pivotal movement of the proximate arm about the first pivot assembly and of the distal arm about the second pivot assembly.

9. The multi-pivot seat base assembly as recited in claim 1, wherein the controllable locking mechanism includes a sprocket fixedly mounted the second shaft and at least one locking element associated with the proximate end of the distal arm and movable towards the sprocket for interconnection therewith to therefore lock pivotal movement of the proximate arm about the first pivot assembly and of the distal arm about the second pivot assembly.

10. The multi-pivot seat base assembly as recited in claim 1, wherein the controllable locking mechanism includes a first sprocket fixedly mounted the first shaft and at least one first locking element associated with the proximate end of the proximate arm and movable towards the first sprocket for interconnection therewith; a second sprocket fixedly mounted the second shaft and at least one second locking element associated with the proximate end of the distal arm and movable towards the second sprocket for interconnection therewith.

11. The multi-pivot seat base assembly as recited in claim 8, wherein the movements of the at least one locking element towards a corresponding sprocket is tangential with respect the sprocket.

12. The multi-pivot seat base assembly as recited in claim 8, wherein the movements of the at least one locking element towards a corresponding sprocket is radial with respect the sprocket.

13. The multi-pivot seat base assembly as recited in claim 8, wherein the movements of the at least one locking element towards a corresponding sprocket is done by a controllable actuator.

14. The multi-pivot seat base assembly as recited in claim 1 where the damping and the controllable locking mechanisms are combined.

15. An ambulance compartment including a floor, wheel wells defining a generally square portion of the floor, an elongated floor mounted rail allowing a conventional stretcher mounted thereto to be positioned in a forward position in the ambulance compartment, and at least two seat bases mounted in the generally square portion of the floor; one of the at least two seat bases being a multi-pivot seat base assembly as recited in claim 1.

* * * * *